(No Model.) 2 Sheets—Sheet 2.
J. W. BUFORD, Jr.
CAR BRAKE.

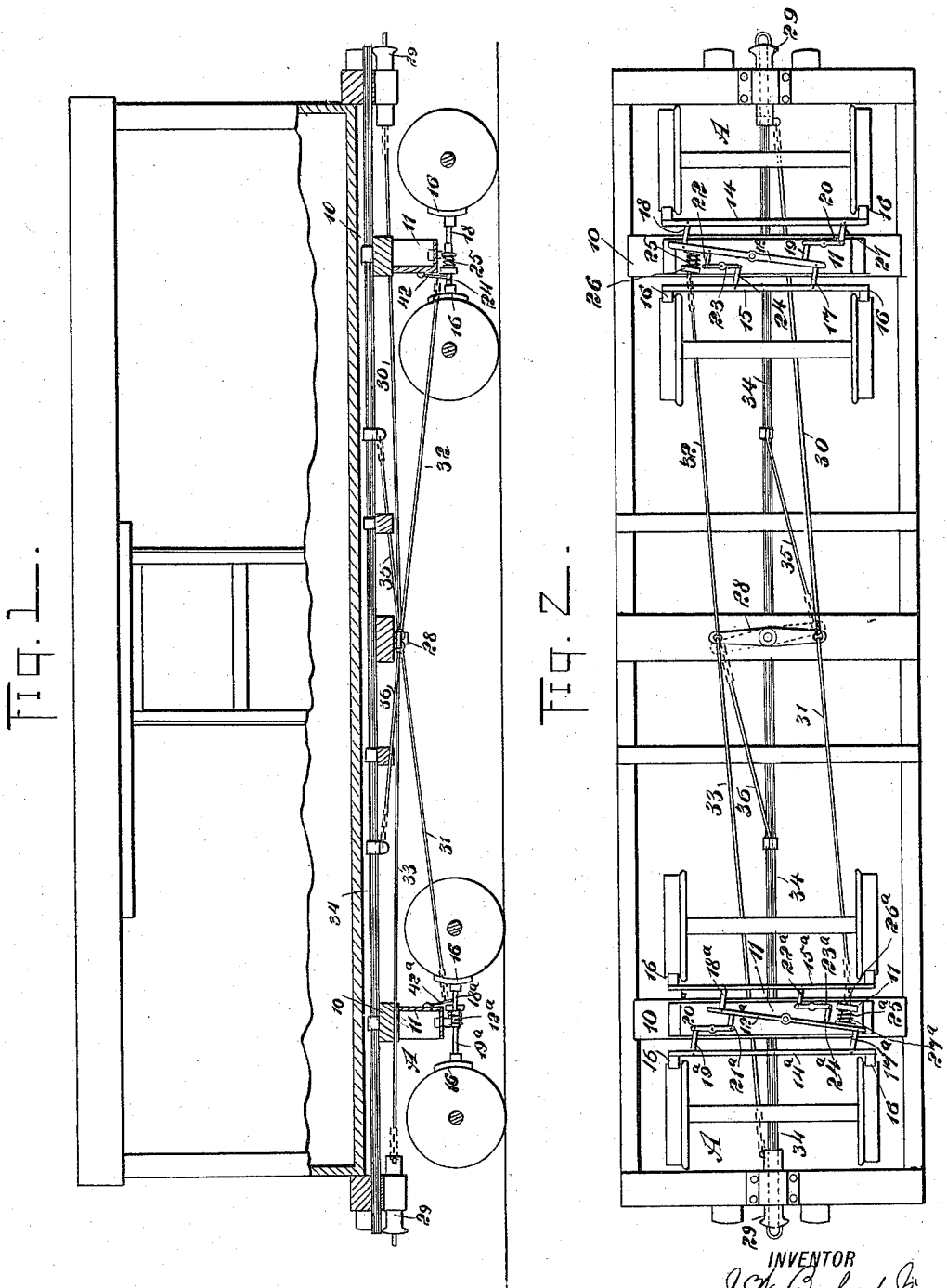

No. 578,964. Patented Mar. 16, 1897.

WITNESSES:
H. Hellyer.
Fred Acker.

INVENTOR
J. W. Buford Jr.
BY
Munn
ATTORNEYS.

UNITED STATES PATENT OFFICE.

JOHN W. BUFORD, JR., OF JACKSON, TENNESSEE.

CAR-BRAKE.

SPECIFICATION forming part of Letters Patent No. 578,964, dated March 16, 1897.

Application filed December 4, 1896. Serial No. 614,431. (No model.)

*To all whom it may concern:*

Be it known that I, JOHN W. BUFORD, Jr., of Jackson, in the county of Madison and State of Tennessee, have invented a new and useful Improvement in Car-Brakes, of which the following is a full, clear, and exact description.

The object of my invention is to provide a car-brake which will remain automatically applied while the car is at rest or while the engine is not actually pulling and which the moment that the car is started ahead will be released from the wheels by the tension applied in the movement of the car.

A further object of the invention is to provide a means whereby the brakes will not only be applied fully when the car comes to a standstill, but whereby in descending an incline the brakes may be applied to a certain extent, and whereby, further, when it is necessary to back a car the brakes may be removed from engagement with the wheels and the car permitted to move unrestrainedly in a rearward direction.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
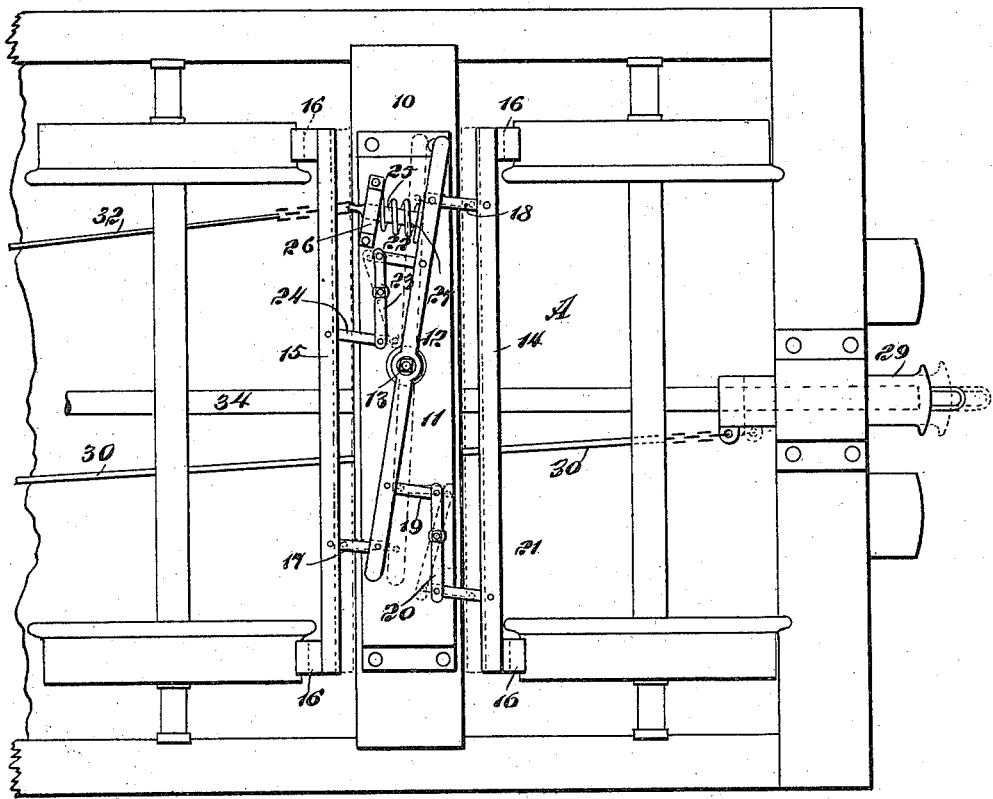
Figure 4:
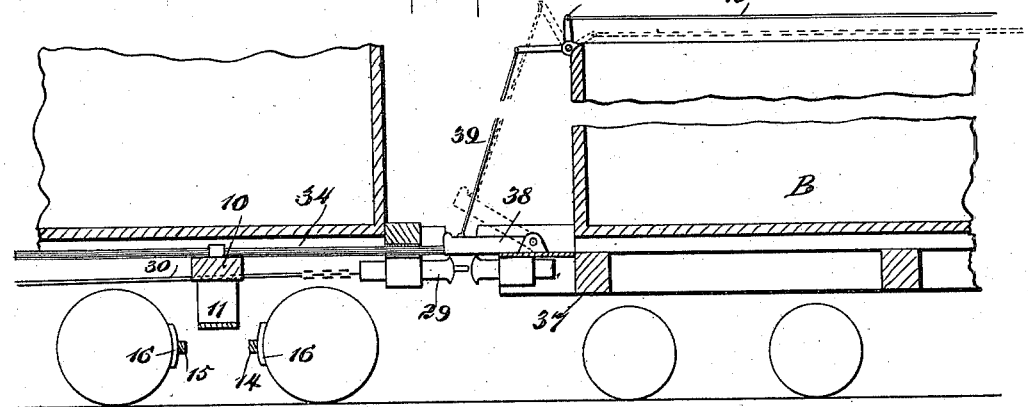

Figure 1 is a longitudinal section taken through the center of a car to which the improved brakes are applied, the brake mechanism, with the exception of its support, being shown in end view. Fig. 2 is a bottom plan view of a car having the brake mechanism applied. Fig. 3 is a bottom plan view, on an enlarged scale, of one end of the car and the improved brake mechanism applied; and Fig. 4 is a longitudinal vertical section through the tender of an engine and the end of a car fitted with the improved brake.

In carrying out the invention each truck A of the car is provided, preferably, with a transverse support 10, located between a pair of wheels, and from each of the said supports a hanger 11 is downwardly projected. Upon the bottom portion of each hanger 11, at or near the center, a lever is centrally fulcrumed through the medium of a pivot-pin 13 or the equivalent thereof, and these levers are designated, respectively, as 12 and $12^a$. The brake-beams of each truck are located parallel with and at each side of the hanger 11, as is best shown in Figs. 2 and 3. The said brake-beams are respectively designated as 14 and 15 and $14^a$ and $15^a$, and each brake-beam has attached thereto any approved form of shoe 16. At one end of the lever 12, at the left-hand side, as shown on the drawings in Fig. 3, a link 17 is pivoted to the lever and to the brake-beam 15, while at the opposite end of the said lever 12, at its right-hand side, a link 18 connects the lever with the brake-beam 14, as shown in the same figure.

At the right-hand side of the lever 12, located near the right-hand end of the car, a link 19 is pivoted to the lever 12 between the end where the direct connecting-link 17 is located and the center. The link 19 is pivotally attached to one end of a short lever 20, this short lever being preferably fulcrumed at its center on the right-hand hanger 11, and the outer end of the lever 20 is pivoted through the medium of a link 21 to the outer brake-beam 14.

At the left-hand side of the right-hand lever 12 an inwardly-extending link 22 is pivotally attached, sustaining substantially the same position relative to the center as the outwardly-extending link 19. The inwardly-extending link 22 is pivotally secured to a shifting lever 23, corresponding to the lever 20, and the shifting lever 23 is likewise preferably centrally fulcrumed and is pivotally connected with the inner brake-beam 15 through the medium of a link 24. It will be observed that the difference between the shifting levers 20 and 23 is that the outer end of one is attached to the main lever 12, while the inner end of the other is connected with the said lever.

A stud 25 is attached to the inner or left-hand side of the right-hand main lever 12 adjacent to the link 18, and this stud is carried loosely through a stirrup 26, secured on the hanger 11, a spring 27 being coiled around the said stud and having bearing against the main lever 12 and against the stirrup 26.

On the left-hand truck of the car the lever $12^a$ is located, heretofore mentioned and corresponding to the right-hand lever 12. A link 17ᵃ is pivoted to the left-hand side of the lever 12ᵃ, near one end of said lever, and to the left-hand or outer brake-beam 14ᵃ, while at the right-hand side of the lever 12ᵃ and near its opposite end a link 18ᵃ connects said lever with the inner or right-hand truck-beam 15ᵃ.

Near that end of the main lever 12ᵃ where the link 18ᵃ is located a shifting lever 20ᵃ is fulcrumed at or near its center on the hanger 11 of the left-hand truck, and the outer end of the shifting lever 20ᵃ is connected with the left-hand or outer brake-beam 14ᵃ by means of a link 19ᵃ, and the inner end of the shifting lever 20ᵃ is connected with the main lever 12ᵃ by means of a link 21ᵃ. The shifting lever 20ᵃ corresponds to the shifting lever 20 at the right-hand side of the main lever on the right-hand truck, but, as shown in Fig. 2, the shifting lever 20ᵃ is located at the left-hand side of the main lever 12ᵃ of the left-hand truck.

Near the end of the main lever 12ᵃ, opposite that at which the shifting lever 20ᵃ is connected, a second shifting lever 23ᵃ is fulcrumed on the hanger 11, and the inner end of this second shifting lever 23ᵃ is connected by a link 22ᵃ with the inner or right-hand brake-beam 15ᵃ, while the outer end of the shifting lever 23ᵃ is connected by a link 24ᵃ with the main lever 12ᵃ, the shifting lever 23ᵃ of the left-hand truck corresponding to the shifting lever 23 of the right-hand truck, but occupying a reverse position with relation to the main lever of the truck.

At the right-hand side of the left-hand main lever 12ᵃ a stud 25ᵃ is attached to the said lever, which is carried loosely through a stirrup 26ᵃ, and a spring 27ᵃ is coiled around the said stud between the stirrup and the main lever 12ᵃ, this spring-controlled stud 25ᵃ corresponding to the stud 25 upon the right-hand truck, yet occupying a reverse position thereto. A lever 28 is fulcrumed at or near its center to the central under portion of the car. Normally the lever 28, which is the main shifting lever for the brake mechanism of the two trucks, stands transversely of the car.

The draw-heads 29 of the car are of the usual spring-controlled type, or of a type which have end movement in their supports. The draw-head at the right-hand end of the car is connected by a rod 30 with one end of the main shifting lever 28, the same end of the main shifting lever 28 being attached, through the medium of a rod 31, with the spring-controlled stud 25ᵃ of the main lever 12ᵃ of the left-hand truck.

The spring-controlled stud 25 of the main lever of the right-hand truck is connected by a rod 32 with the opposite end of the main shifting lever 28, and at this end of the main shifting lever a second rod 33 is attached, which is connected with the draw-head at the left-hand end of the car. A shaft 34 extends from one end of the car to the other over the draw-heads, being passed through suitable bearings, and a rod 35 is connected with the shifting lever 28 at that end where the rods 30 and 31 for the trucks are attached, the rod 35, which is a short one and is a shifting rod, being carried to and connected with the shifting shaft 34, between its center and its right-hand end. A second short shifting rod 36 is attached to the shifting shaft 34, between its center and left-hand end, and to the opposite end of the main shifting lever 28 or where the connecting-rods 32 and 33 are attached to the said main shifting lever.

Over the draw-head or on the platform 37 of the tender B a buffer-bar 38 is pivoted, and this buffer-bar is adapted, when in a horizontal position, to engage with the end of the shifting shaft 34 of the car which is next to the tender; but the buffer-bar may be raised by any suitable means, as, for example, through the medium of links 39 and 40, connected with opposite ends of an elbow-lever 41, the said lever being carried to the cab of the engine, for example.

In operation the springs 27 and 27ᵃ normally hold the main levers 12 and 12ᵃ of the trucks diagonally of their hangers, as shown in Fig. 2, or in such position that the brake-shoes of the brake-beams connected with these main levers will be firmly in engagement with the wheels. When a car is drawn forward by the engine, the draw-head with which the engine is coupled will be carried outward, and in being drawn outward, supposing it to be the draw-head at the right-hand end of the car, the rod 30 will be drawn in direction of the right-hand end of the said car, carrying the main shifting lever 28 to the dotted position shown in Fig. 2, or diagonally across the bottom of the car, causing the connecting-rod 31 to draw in direction of the right-hand end of the car on the spring-controlled stud 25ᵃ of the left-hand brake mechanism, and the connecting-rod 32 to draw the spring-controlled stud of the brake mechanism on the right-hand truck in direction of the left-hand end of the car, or, in other words, both the springs 27 and 27ᵃ will be placed under tension and the main levers 12 and 12ᵃ will be brought substantially transversely of the car and the brake-shoes carried out of engagement with the wheels.

The same result may be accomplished, namely, the brakes removed from the wheels when the train is backed, by simply permitting the bar 38 of the tender to drop to the horizontal position shown in Fig. 4, whereupon as the train is backed its buffer-bar will engage an end of the shifting shaft 34 of the car next the tender, forcing this particular shaft backward, and the said shaft connecting with that of the next car forces it backward, and as the shafts 34 are connected with the main shifting lever 38 this lever will be operated in a manner to bring the main levers 12 and 12ᵃ of the truck transversely of the car, removing the brakes from the wheels. In any event the moment that the car ceases to move the brakes immediately apply themselves through the instrumentality of the springs 27 and 27ª, which will have been released from tension.

It will be observed by reference to Fig. 1 that the connecting-bars 31 and 32 are attached to links, (designated as 42 and 42ª,) the links being secured to the hangers 11. The link 42 is connected with the spring-controlled post 25, while the link 42ª is connected with the spring-controlled post 25ª. These links 42 and 42ª are not absolutely necessary, but are used as a convenient means for effecting a union between said connecting-rods and the said spring-controlled posts or tension devices.

Having thus described my invention, I claim as new and desire to secure by Letters Patent—

1. In a car-brake, the combination, with the brake-beams, a lever located between the brake-beams and connected with the said beams near its ends, auxiliary levers located at opposite sides of the main lever, connecting the main lever also with the brake-beams, and a tension device connected with the main lever, of a draft-bar, a shifting lever, and connecting-rods uniting the draft-bar with the shifting lever and the shifting lever with the tension device, substantially as shown and described.

2. In a car-brake, the combination, with the brake-beams of a truck, a lever fulcrumed near its center, having link connections at opposite sides of opposite ends with the brake-beams, auxiliary levers having link connection with the main lever between its outer ends and center, the auxiliary levers being likewise connected with the brake-beams, one of the auxiliary levers being located at each side of the main lever and in opposite directions from its center, of a shifting lever, a draft-bar, a connecting-rod uniting the draft-bar with the shifting lever, a tension device attached to the main lever, located between the brake-beams at the inner side of the said lever, and a connecting-rod attached to the tension device and to the shifting lever, as and for the purpose set forth.

3. In a car-brake, the combination, with the brake-beams of a truck, a lever fulcrumed near its center, having link connections at opposite sides of opposite ends with the brake-beams, and auxiliary levers having link connection with the main lever between its outer ends and center, the auxiliary levers being likewise connected with the brake-beams and one of the auxiliary levers being located at each side of the main lever and in opposite directions from its center, of a shifting lever, a draft-bar, a connecting-rod uniting the draft-bar with the shifting lever, a tension device attached to the main lever and located between the brake-beams at the inner side of the said lever, a connecting-rod attached to the tension device and to the shifting lever, a shaft having end movement, a connection between the said shaft and the said shifting lever, and a buffer-shaft adapted to be located upon a tender and arranged for engagement with the aforesaid shaft, as and for the purpose set forth.

4. The combination of two brake-beams, a lever fulcrumed between the beams, a link pivoted to each arm of the lever and respectively pivoted to the brake-beams, two auxiliary levers respectively connected with the brake-beams and with the respective arms of the main lever, and means for actuating the main lever, substantially as described.

5. The combination of two brake-beams, a main lever fulcrumed between the brake-beams, a link connected to each arm of the main lever and respectively connected to the brake-beams, two auxiliary levers, one arm of each having connection with the respective brake-beams and the second arm of each auxiliary lever having connection with the respective arms of the main lever, a spring pressing the main lever, and means having connection with the main lever whereby it may be operated adversely to the spring, substantially as described.

6. The combination with a car, of a shaft slidable longitudinally beneath the car, a shifting lever fulcrumed beneath the car and in connection with the shaft, two brake-beams removed from the shifting lever, a spring located between the brake-beams and pressing the same apart to normally apply the brakes, means between the brake-beams for drawing them against the tension of the spring, and a connection between said means and the shifting lever, substantialy as described.

JOHN W. BUFORD, Jr.

Witnesses:
H. B. GILMORE,
M. D. ANDERSON.